United States Patent [19]

Guscott

[11] Patent Number: 4,514,631

[45] Date of Patent: Apr. 30, 1985

[54] OPTICAL SYSTEM FOR CEILING MOUNTED PASSIVE INFRARED SENSOR

[75] Inventor: John K. Guscott, Lynnfield, Mass.

[73] Assignee: American District Telegraph Company, New York, N.Y.

[21] Appl. No.: 454,852

[22] Filed: Dec. 30, 1982

[51] Int. Cl.³ .................................................. G01J 5/08

[52] U.S. Cl. .................................... 250/342; 250/338; 250/353

[58] Field of Search ................. 250/338 PY, 342, 353; 340/567

[56] References Cited

U.S. PATENT DOCUMENTS

| | | | |
|---|---|---|---|
| 3,036,219 | 5/1962 | Thompson | 250/211 R |
| 3,453,432 | 7/1969 | McHenry | 250/338 |
| 3,524,180 | 8/1970 | Cruse | 250/349 |
| 3,551,676 | 12/1970 | Runnels | 250/353 |
| 3,631,434 | 12/1971 | Schwartz | 250/349 |
| 3,703,718 | 11/1972 | Berman | 250/338 |
| 3,886,360 | 5/1975 | Reiss et al. | 250/338 |
| 4,375,034 | 2/1983 | Guscott | 250/342 |
| 4,385,833 | 5/1983 | Gardner | 356/141 |

*Primary Examiner*—Alfred E. Smith
*Assistant Examiner*—Constantine Hannaher
*Attorney, Agent, or Firm*—Weingarten, Schurgin Gagnebin & Hayes

[57] ABSTRACT

A ceiling mountable passive infrared intrusion detection system is disclosed having a mirror assembly providing a first protective curtain which is relatively narrow in the horizontal plane and which substantially encompasses the vertical space of a protected facility, and providing a second protective curtain which is relatively narrow in the vertical plane and which substantially encompasses 360° of horizontal space of a protected facility. A temperature stabilized and shock insensitive infrared detector is disposed along the optical axis and at the focal point of the system to provide electrical signals in response to received radiation from the field of view of the protective curtains. The electrical signals are electronically processed to provide an output indication of intruder presence when in motion about both the floor area and the space between the floor area and the ceiling of a protected facility.

15 Claims, 7 Drawing Figures

OPTICAL SYSTEM FOR CEILING MOUNTED PASSIVE INFRARED SENSOR

This invention is related to application Ser. No. 173,124 of the same inventive entity and assigned to the same assignee now U.S. Pat. No. 4,375,034.

FIELD OF THE INVENTION

This invention relates to intrusion detection systems and more particularly to a ceiling mountable passive infrared intrusion detection system.

BACKGROUND OF THE INVENTION

Passive infrared intrusion detection systems are known for sensing the presence of an intruder in a protected space and for providing an output signal representative of intruder detection. Examples of passive infrared intrusion detection systems are shown in U.S. Pat. Nos. 3,036,219; 3,524,180; 3,631,434; 3,703,718; and 3,886,360. It is an object of the present invention to provide a system and a mirror assembly therefor especially suited to ceiling mounting to produce a field of view through which an intruder must pass when moving about the floor area of a protected region and through which an intruder must pass when moving between the ceiling and the floor of the protected area.

SUMMARY OF THE INVENTION

Briefly, the ceiling mountable passive infrared intrusion detection system of the present invention provides a plurality of radially outwardly extending generally vertical first curtains symmetrically disposed azimuthally, and a generally disc shaped thin second curtain transverse the vertical curtains. Each of the vertical curtains have a relatively broad field of view in the vertical plane and a relatively narrow field of view in the horizontal plane. The vertical curtains are arranged within a facility being monitored such that an intruder must traverse these curtains when in motion about the floor of the protected area and thereby trigger an intruder alarm. The generally disc-shaped thin curtain continuously extends 360° azimuthally and is relatively narrow in the vertical direction. The generally disc-shaped thin curtain is arranged within a facility being monitored such that an intruder must traverse this curtain when in motion between the ceiling and the floor of the area to be protected and thereby trigger an intruder alarm. The system includes a mirror assembly having a focusing mirror and an array of adjacent cylindrical mirror facets each of which are cooperative with the focusing mirror to provide the field of view of the vertical curtains. The cylindrical mirror facets are symmetrically disposed around 360° of azimuth to provide multiple generally vertical first curtains. A conical mirror is cooperative with the focusing mirror to provide the field of view of the generally disc-shaped second curtain. The conical mirror is concentrically disposed within the array of adjacent cylindrical mirror facets. An infrared detector is disposed along the optical axis of the focusing mirror and at the focus thereof to provide an electrical signal in response to received radiation from the field of view of the first curtains and the field of view of the second curtain. The detector signals are electronically processed to provide an output indication of intruder presence when moving about the floor or through the air space of the protected facility.

DESCRIPTION OF THE DRAWINGS

The invention will be more fully understood from the following detailed description taken in conjunction with the accompanying drawings in which.

DETAILED DESCRIPTION OF THE INVENTION

Figure 1:
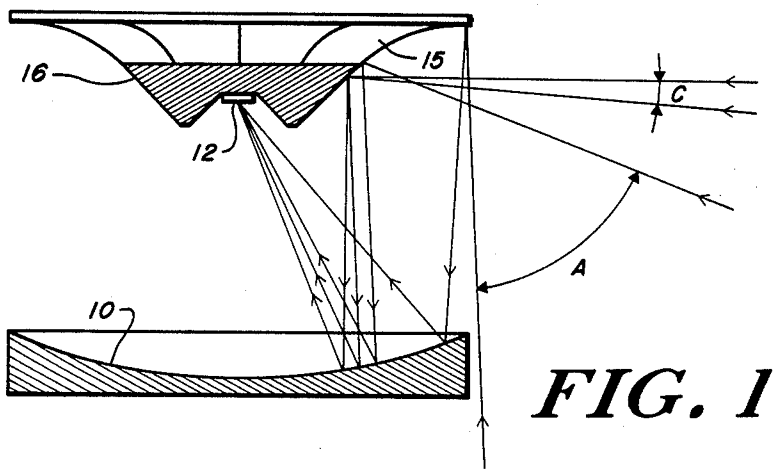
FIG. 1 is an elevational view, partially in section, of a mirror assembly embodying the present invention.

Referring now to FIG. 1, there is shown an elevational view, partially in section, of a mirror assembly illustrating the ceiling mountable passive infrared intrusion detection system in accordance with the invention. The mirror assembly includes a focusing mirror 10, an infrared detector 12 disposed along the optical axis of the mirror 10 and at the focus thereof, a circular array of adjacent cylindrical mirror facets 15 each oriented to provide a predetermined first field of view and to cooperate with the mirror 10 to direct infrared radiation within the associated field of view to the cooperative portion of the mirror 10 and thence to detector 12, and a conical mirror 16 oriented to provide a predetermined second field of view and to cooperate with mirror 10 to direct infrared radiation within the second field of view to the cooperative portion of the mirror 10 and thence to the detector 12. Preferably, the mirrors 15 have their cylindrical axes orthogonal to the optical axis of mirror 10, and the mirror 16 has its longitudinal axis coincident with the optical axis of the mirror 10. The detector 12 is operative to provide electrical signals in response to received infrared radiation that are electronically processed to provide an output indication of intruder presence about the floor and in the air space of a protected facility.

Figure 2A:
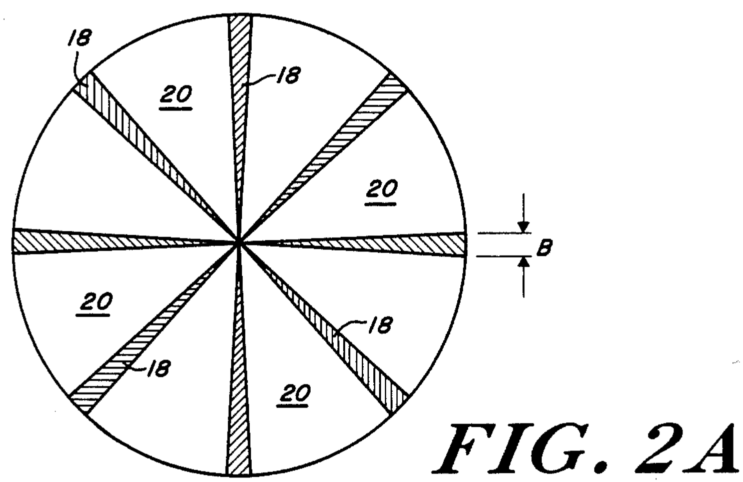
FIG. 2A shows a plan view of the fields of view of the mirror assembly of the present invention.
Figure 3:
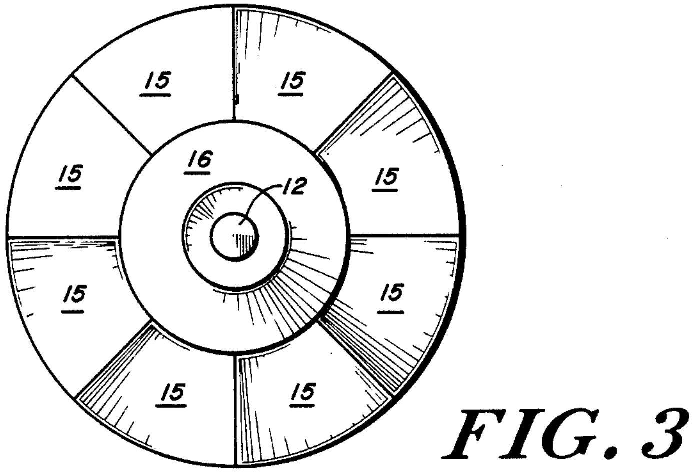
FIG. 3 is a plan view of the field forming mirror subassembly of the mirror assembly of the present invention.
Figure 2B:
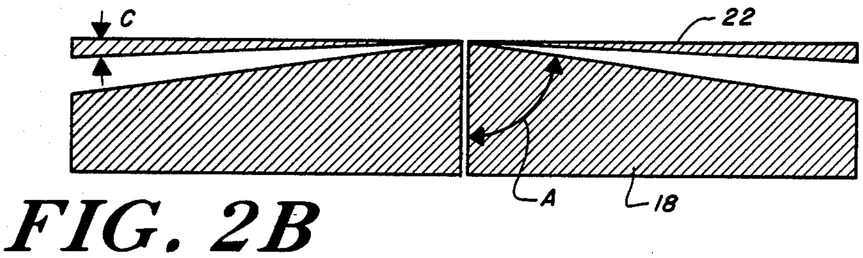
FIG. 2B shows an elevational view of the field of view of the mirror assembly of the present invention.

In typical use, the mirror assembly is oriented with the optical axis of the mirror 10 and the optical axis of the mirror 16 vertical and the axes of mirrors 15 horizontal. The cylindrical mirror facets 15 allow each of the fields of view to be relatively narrow in the horizontal plane, as shown in FIG. 2A, and relatively large in the vertical plane, as shown in FIG. 2B. The horizontal field of view or divergence angle designated "B" (FIG. 2A) is controlled by the focal length of the focusing mirror 10. The curvature and arclength of the cylindrical mirror facets 15 are determined in relation to the curvature of the focusing mirror to provide the intended vertical field of view or vertical divergence angle designated "A" (FIG. 2B). The front and rear edges of the cylindrical mirror facets 15 determine the limits or extent of the vertical field of view. The forward edge delimits the lower boundary of the field of view, while the upper boundary of this field of view is determined by the rearward edge. In the illustrated embodiment, a vertical divergence angle of about 8.25° typically is provided, while a horizontal divergence angle of about 5° typically is provided. As illustrated in FIG. 3, eight such adjacent cylindrical mirror facets 15 are symmetrically arranged circumferentially about 360° of azimuth to provide the eight first curtains 18 (FIG. 2A) having a generally vertical field of view (FIG. 2B). The field of view of the generally vertical first curtains in the illustrated embodiment extends from about 0° to about −15.5° below the horizontal. The range of the first curtains depends on the focal length of the mirror 10 and upon the size of the detector 12. Typically, the focal length and element size are selected to image a human-size target at a nominal range. As a result, the area to be protected is fully protected against intruder translation about the floor of the protected space. Although eight circumferentially symmetric cylindrical mirror segments are specifically illustrated, a greater or a lesser number of symmetrically or non-symmetrically arranged mirrors can be employed as well without departing from the inventive concept.

The conical mirror 16 allows the field of view of the second curtain to be generally disc-shaped and to extend 360° azimuthally as shown at 20 in FIG. 2A, and to be relatively narrow in elevation as shown at 22 in FIG. 2B. The extent of elevational variation, the so-called drop-through angle designated "C", is determined by the focal length of the mirror 10 and the size of the detector 12. Typically, a 2.5° drop-through angle is obtained in the illustrated embodiment. As a result of the second field of view provided by the conical mirror, the area to be protected is fully protected against intruder translation between the ceiling and the floor of the protected area.

Figure 4A:
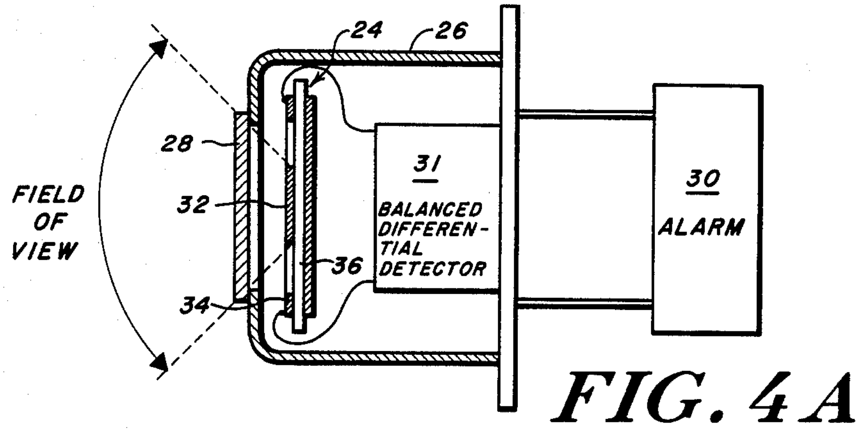
FIG. 4A shows an elevational view of the detector subassembly, partially in schematic, of the mirror assembly of the present invention.
Figure 4B:
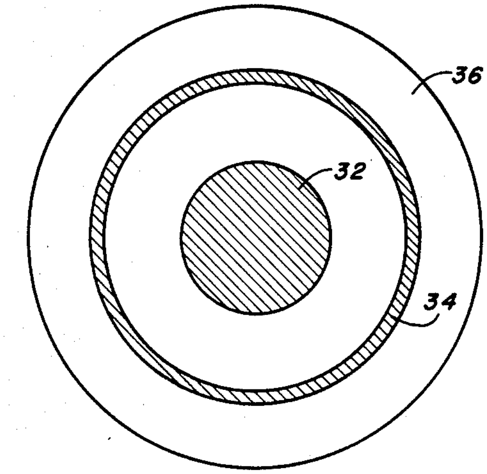
FIG. 4B shows a plan view of the detector subassembly of the mirror assembly of the present invention.
Figure 4C:
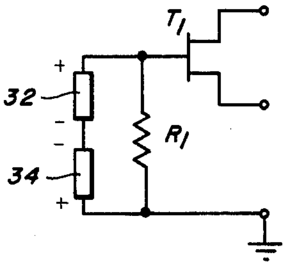
FIG. 4C shows a schematic diagram of the detector subassembly of the mirror assembly of the present invention.

The detector subassembly of the present invention as shown in FIG. 4A includes a detector element generally designated 24 mounted in a housing 26 having an infrared window 28, such as germanium or silicon. The element 24 is connected to an alarm 30 via a balanced differential detector 31. As shown in FIG. 4B, the element 24 preferably is constructed to have an inner infrared sensitive element 32 and an outer infrared sensitive element 34 concentric therewith and of equal area. The elements 32 and 34 are formed on a pyroelectric substrate 36. As shown in FIG. 4A, the element 24 is mounted in the housing 26 such that only the central sub-element 32 is in external radiation receiving relationship, and the sub-element 34 is concealed from the external radiation to provide immunity from temperature changes, vibration, and shock. Any suitable pyroelectric substrate can be utilized such as thickness poled ceramic PZT, lithium tantalate, and polyvinylidene fluoride, among others. In the preferred embodiment of the balanced differential circuit as shown in FIG. 4C, the detector sub-elements 32 and 34 are shunted by a resistor R1 and serially connected in electrical phase opposition. The currents developed in response to radiation received thereon from the first and second fields of view of the ceiling mountable infrared intrusion detection system of the invention is applied to an FET, T1, which is operative in response thereto to trigger an alarm indication of intruder presence. As shown in FIG. 1, the detector 12 is preferably mounted in a recess provided therefor in the conical mirror to help protect it from unwanted radiation and air turbulence. It should be noted that the detector can be otherwise mounted in position to receive infrared radiation without departing from the inventive concept.

The shape of the cylindrical mirrors can be varied to control the system aperture to vary the system sensitivity across the viewing field. For example, the cylindrical mirrors can be structured or shaped to provide lower sensitivity to objects near the detector and higher sensitivity to objects further removed from the detector. A smaller cylindrical surface area provides a smaller aperture and therefore lower sensitivity. While the image at the detector is distorted by the cylindrical mirrors, such distortion is not of any material detriment to system performance, since intruder detection is based upon the change in received radiation due to a moving intruder entering or leaving corresponding ones of the fields of view rather than precise imaging of the intruder onto the detector. The focusing mirror preferably is a spherical segment and of sufficient size to cover the full aperture of the cylindrical mirrors without obstructing the fields of view.

The invention thus provides a ceiling mountable passive infrared intrusion detection system in which one or more first solid curtains of protection are provided to achieve an area of surveillance which cannot readily be compromised or circumvented by an intruder in translation about the floor area whether by crawling or by jumping, and in which a second solid curtain of protection transverse the one or more first curtains is provided to achieve an area of survelliance which cannot be readily compromised or circumvented by an intruder whether dropping into the area to be protected such as through an unauthorized hole in the ceiling of the protected area or scaling upwardly to the ceiling such as on a rope. The optical aperture can be easily controlled by shaping of the cylindrical mirror surfaces. Uniform detection sensitivity is obtained irrespective of the range of an intruder.

It will be appreciated that many modifications of the presently disclosed invention can be effected without departing from the scope of the appended claims.

What is claimed is:

1. A ceiling mountable passive infrared intrusion system having a combination mirror assembly for detecting an intruder both when present on the floor of an area to be protected and when present between the ceiling and the floor of the area to be protected, comprising:

a first mirror having an optical axis for focusing radiation incident thereon at a point focus along its optical axis;

a mirror sub-assembly including a second mirror for providing a curtain-like first field of view that has a nominal range, a comparatively narrow azimuthal extent, and a comparatively wide elevational extent, and cooperative with the first mirror for directing the radiation present in the first field of view onto the point focus;

said mirror sub-assembly including a third mirror for providing a disc-like second field of view that is generally transverse the first field of view that has a nominal range, a comparatively narrow elevational extent, and a comparatively wide azimuthal extent, and cooperative with the first mirror for directing the radiation present in the second field of view onto the point focus; and an infrared detector positioned at the point focus of the first mirror along the optical axis thereof and operative in response to the radiation focused thereat to provide an electrical signal representative of intruder presence.

2. The system of claim 1, wherein the first mirror is a focusing mirror having a two-dimensional surface selectively curved along both of the dimensions of the focusing mirror.

3. The system of claim 2, wherein the focusing mirror is spherical.

4. The system of claim 1, wherein said second mirror is a field forming mirror having a two-dimensional surface selectively curved along only one of the dimensions of the two-dimensional surface.

5. The system of claim 4, wherein the field-forming mirror is cylindrical.

6. The system of claim 4, wherein said mirror subassembly further includes additional second mirrors each cooperative with the first mirror for providing additional first fields of view selectively spaced apart over 360 degrees of azimuth.

7. The system of claim 1, wherein the third mirror has a geometry which is a figure of revolution.

8. The system of claim 7, wherein the comparatively broad azimuthal extent of the field of view of the third mirror extends a full 360 degrees of azimuth.

9. The system of claim 8, wherein the third mirror is a truncated cone.

10. The system of claim 1, wherein the detector is a bi-element detector having a central first sub-element and a concentric second annular sub-element of equal areas, and further including a detector housing having an infrared transparent window, and wherein the bi-element detector is mounted in the housing so that the central first sub-element is exposed to radiation and the second concentric sub-element is concealed from radiation to provide temperature and vibration stability.

11. The system of claim 10, further including a balanced differential circuit connected to the bi-element detector.

12. The system of claim 9, wherein the truncated cone has an apex, and wherein the detector is mounted in a chamber formed below the apex of the truncated cone to minimize the reception of unwanted radiation.

13. The system of claim 4, wherein the arc length of the cylindrical field forming mirror determines the elevational extent of the first field of view.

14. The system of claim 13, wherein the focal length of the focusing mirror and the size of the detector cooperate to determine the azimuthal extent of the first field of view.

15. The system of claim 14, wherein the focal length of the first mirror and the size of the detector cooperate to determine the elevational extent of the second field of view.

* * * * *